A. WYCKOFF.
BARREL.
No. 6,814. Reissued Dec. 21, 1875.
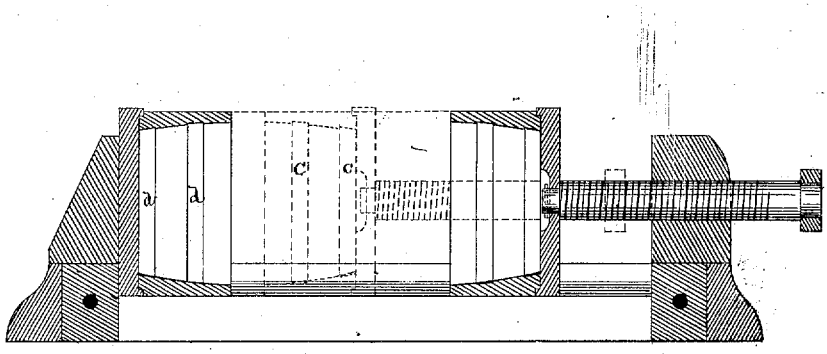
WITNESSES:
Edwd. Payson
E. H. Williams
INVENTOR.
Arcalous Wyckoff
Per Edw. E. Quimby
Atty.

UNITED STATES PATENT OFFICE.

ARCALOUS WYCKOFF, OF ELMIRA, N. Y., ASSIGNOR TO THE SEAMLESS KEG AND CAN COMPANY, OF SAME PLACE.

IMPROVEMENT IN BARRELS.

Specification forming part of Letters Patent No. 51,643, dated December 19, 1865; reissue No. 6,814, dated December 21, 1875; application filed March 3, 1875.

DIVISION B.

*To all whom it may concern:*

Be it known that I, ARCALOUS WYCKOFF, of Elmira, Chemung county, New York, have invented an Improvement in Barrels, of which the following is a specification:

My invention relates to barrel-cylinders; and consists of a barrel formed by annularly compressing both ends of its cylindriform portion by means of flaring cup-dies, with recesses for hoops, so as to produce a progressively-increasing taper from the central portion toward the ends, and simultaneously drive the barrel-cylinder into its hoops, thus imparting to the cylinder the bulge shape of a barrel, and retaining the same in such shape.

My improved barrel can be constructed more rapidly and economically, and is better and stronger, than a barrel made in the ordinary manner from tapering staves, for the following reasons: First, it contains more of the fiber of the wood, the same being compressed and retained in the barrel, instead of being cut out and thrown away; second, the compression, by means of flaring cup-dies, being regular in its increment from each end of the cylinder, preserves the fiber from kinking and breakage; third, by the simultaneous hooping of both ends of the barrel at the same time with the formation of the bulge by compression much time is saved, and a regularity of form and appearance is obtained and preserved.

I construct my barrel by subjecting a hollow cylinder of wood to the action of two flaring cup-dies, with annular recesses for holding the hoops, which, respectively, embrace the ends of the barrel-cylinder, and are forced together, so that the opposite extremities of the cylinder are crowded into the cup-dies and driven through the hoops placed within the recesses simultaneously, and are thereby annularly compressed, and made to assume the curved inward shape of the interior of such dies, and are held in place by the hoops when removed from the dies, as will be found more fully described in my patent for a machine for this purpose, dated December 19, 1865. The barrel-heads also are applied by this machine.

The accompanying drawing exhibits a longitudinal section of my compressing-machine, showing the cup-dies separated in suitable position to receive a barrel-cylinder. The dotted lines indicate the position assumed by the movable die at the completion of the operation of forming a barrel.

It will be seen that in their position the interior outlines of the two dies exhibit the bulging shape of a barrel.

The dotted double lines *c c* represent two hoops in their places upon one portion of the finished barrel, and the double lines *d d* two corresponding hoops upon the other portion.

I am aware that the heads have been secured in seamless kegs and other cooper's ware by annular compressing the extremities of the shell. I do not, therefore, claim, broadly, a barrel having its head secured by the annular compression of its cylindriform part; but

I claim as my invention—

As a new article of manufacture, a barrel whose cylindriform part is annularly compressed in variable degrees from its central portion progressively to its ends, substantially as set forth.

A. WYCKOFF.

Witnesses:
R. C. RICE,
W. DEWATERS